US012658630B2

(12) United States Patent
Li et al.

(10) Patent No.: US 12,658,630 B2
(45) Date of Patent: Jun. 16, 2026

(54) CONNECTOR UNIT

(71) Applicant: Japan Aviation Electronics Industry, Limited, Tokyo (JP)

(72) Inventors: Teng Li, Tokyo (JP); Kazunobu Nakamura, Tokyo (JP); Naoki Iwao, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 352 days.

(21) Appl. No.: 18/411,977

(22) Filed: Jan. 12, 2024

(65) Prior Publication Data

US 2024/0154347 A1 May 9, 2024

Related U.S. Application Data

(63) Continuation of application No. PCT/JP2022/017834, filed on Apr. 14, 2022.

(30) Foreign Application Priority Data

Aug. 3, 2021 (JP) ................................ 2021-127041
Aug. 3, 2021 (JP) ................................ 2021-127329

(51) Int. Cl.
*H01R 13/44* (2006.01)
*H01R 13/447* (2006.01)
*H01R 13/52* (2006.01)

(52) U.S. Cl.
CPC ....... *H01R 13/447* (2013.01); *H01R 13/5227* (2013.01)

(58) Field of Classification Search
CPC .................................................... H01R 13/447
USPC ................................ 439/135, 148, 205, 206
See application file for complete search history.

(56) References Cited

U.S. PATENT DOCUMENTS

| | | | | |
|---|---|---|---|---|
| 8,827,731 B2 * | 9/2014 | Sasaki | H01R 13/46 | |
| | | | 439/206 | |
| 2012/0295460 A1 | 11/2012 | Ichio et al. | | |
| 2015/0343914 A1 * | 12/2015 | Osawa | B60L 53/16 | |
| | | | 439/205 | |

FOREIGN PATENT DOCUMENTS

| | | | |
|---|---|---|---|
| CN | 201584571 U | 9/2010 | |
| CN | 208986250 U | 6/2019 | |
| JP | H10255900 A | 9/1998 | |
| JP | 2006-066679 A | 3/2006 | |
| JP | 2006-164857 A | 6/2006 | |
| JP | 2009-290941 A | 12/2009 | |
| JP | 2019-204598 A | 11/2019 | |

* cited by examiner

*Primary Examiner* — Phuong K Dinh
(74) *Attorney, Agent, or Firm* — MUNCY, GEISSLER, OLDS & LOWE, P.C.

(57) ABSTRACT

A connector unit includes a connector housing that has a front plate portion and two or more through-holes penetrating the front plate portion and communicating with an inside of the connector housing, two through-holes of the two or more through-holes are separately positioned at two vertexes, opposed to each other, of a rectangular surrounding an opening portion in the front plate portion, and when the connector unit is disposed, one of the two through-holes is situated on an upper side from the opening portion and serves as a cap attachment hole, and the other of the two through-holes is situated on a lower side from the opening portion and serves as a drain hole.

4 Claims, 11 Drawing Sheets

CONNECTOR UNIT

CROSS REFERENCE TO RELATED APPLICATIONS

This application is a Continuation of co-pending Application No. PCT/JP2022/017834, filed on Apr. 14, 2022, for which priority is claimed under 35 U.S.C. § 120; and this application claims priority of Application Nos. 2021-127041 and 2021-127329, both filed in Japan on Aug. 3, 2021, under 35 U.S.C. § 119, the entire contents of all of which are hereby incorporated by reference.

BACKGROUND OF THE INVENTION

The present invention relates to a connector unit, particularly to a connector unit in which an opening portion is openably and closably covered by a cap, the opening portion allowing a counter connector to be inserted therein in a fitting process.

A connector unit capable of discharging, to the outside thereof, water that has entered through an opening portion which allows a counter connector to be inserted therein has been disclosed in, for example, JP 2019-204598 A. As shown in FIG. 21, the connector unit is provided with a connector housing 1 formed of an insulating resin, and the connector housing 1 includes a housing body portion 2 of cuboid shape and a front plate portion 3 of rectangular shape formed at a front end of the housing body portion 2.

The front plate portion 3 is provided with an opening portion 4, and in a fitting process with a counter connector, the counter connector is inserted into the opening portion 4 along a fitting axis and fitted with a connector portion (not shown) disposed inside the housing body portion 2. The opening portion 4 has an oval shape elongated in a predetermined direction, and a back part of the front plate portion 3 is provided with drain passages 5 to 8 extending from opposite ends in the predetermined direction of the opening portion 4 to edges of the front plate portion 3.

Since the drain passages 5 to 8 extend from the opposite ends of the opening portion 4 to the edges of the front plate portion 3, even when the connector unit is disposed in such a position that the opening portion 4 extends in a horizontal direction or a vertical direction, water that has entered the connector housing 1 through the opening portion 4 can be discharged to the outside of the connector housing 1 through at least one of the drain passages 5 to 8.

For the purpose of protecting the connector portion disposed inside the housing body portion 2, it has been desired to attach, to the connector housing 1, a cap that openably and closably covers the opening portion 4. In this case, in order to turn the attached cap upward to expose the opening portion 4, the cap is preferably attached by use of an attachment hole formed in a part of the front plate portion 3 on the upper side from the opening portion 4, depending on the position in which the connector unit is disposed.

To cope with it, one may have an idea that a large number of attachment holes are formed in the front plate portion 3 in preparation for both the case where the connector unit is disposed in such a position that the long sides of the front plate portion 3 extend in a horizontal direction and the case where the connector unit is disposed in such a position that the long sides of the front plate portion 3 extend in a vertical direction; however, there is a problem in that the structure of the connector unit becomes complicated because it is necessary to form a large number of drain passages 5 to 8 and a large number of attachment holes in order to discharge water and attach the cap.

SUMMARY OF THE INVENTION

The present invention has been made to overcome the conventional problem described above and aims at providing a connector unit in which an opening portion of a connector housing is openably and closably covered by a cap and which is capable of discharging water that has entered the connector housing through the opening portion while having a simple structure.

A connector unit according to the present invention is one in which an opening portion for inserting a counter connector is openably and closably covered by a cap, the connector unit comprising:

- a connector portion to be fitted with the counter connector;
- a connector housing retaining the connector portion and having the opening portion; and
- the cap that is attached to the connector housing,
- wherein the connector housing includes a front plate portion that is provided with the opening portion, and two or more through-holes penetrating the front plate portion and communicating with an inside of the connector housing,
- two through-holes of the two or more through-holes are positioned at two vertexes situated on one diagonal line of a rectangular surrounding the opening portion in the front plate portion, and
- when the connector unit is disposed, one of the two through-holes is situated on an upper side from the opening portion and serves as a cap attachment hole for attaching the cap to the connector housing, and another of the two through-holes is situated on a lower side from the opening portion and serves as a drain hole for the connector housing.

DETAILED DESCRIPTION OF THE INVENTION

Embodiments of the present invention are described below based on the accompanying drawings.

Embodiment 1

Figure 1:
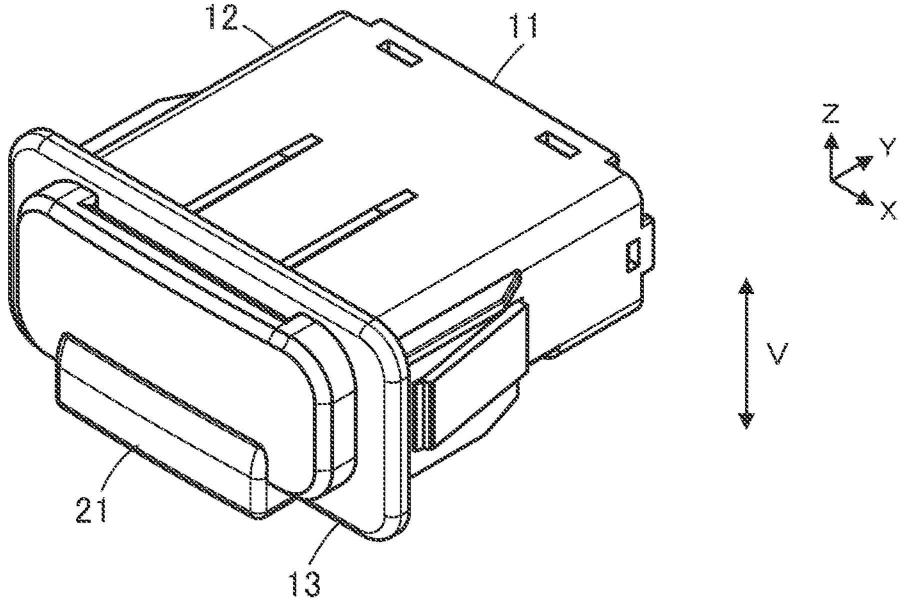
FIG. 1 is a perspective view showing a connector unit in a first position in Embodiment 1.
Figure 2:
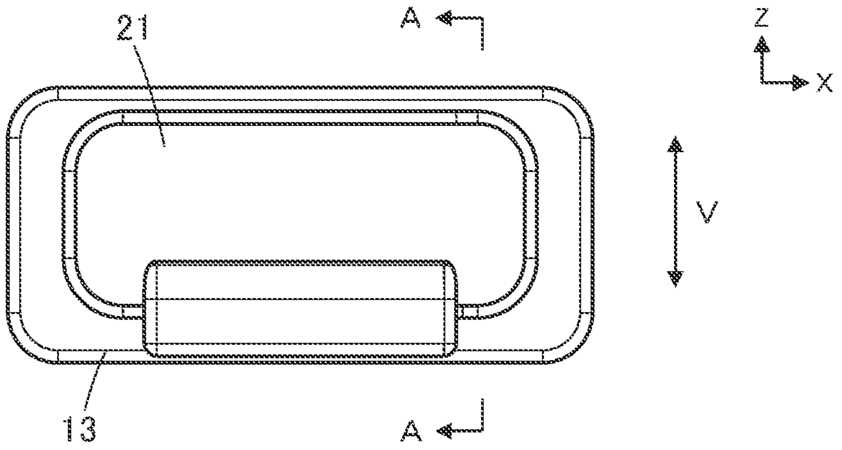
FIG. 2 is a front view showing the connector unit in the first position in Embodiment 1.

FIGS. 1 and 2 are a perspective view and a front view, respectively, each showing a connector unit according to Embodiment 1. The connector unit includes a connector housing 11 made of an insulating material such as an insulating resin and a cap 21 attached to a front part of the connector housing 11 and made of an elastic material such as ethylene propylene diene rubber (EPDM).

The connector housing 11 includes a housing body portion 12 having a substantially cuboid shape and a front plate portion 13 of rectangular shape formed at a front edge of the housing body portion 12, and the cap 21 is disposed so as to cover the front plate portion 13 of the connector housing 11.

For convenience, the direction in which the long side of the front plate portion 13 extends along a surface of the front plate portion 13 is called "X direction," the direction which is orthogonal to the X direction and extends from the front part of the connector housing 11, where the front plate portion 13 is provided, to a back part of the connector housing 11 is called "+Y direction," and the direction perpendicular to an XY plane is called "Z direction."

Note that the connector unit shown in FIGS. 1 and 2 is disposed in a first position in which the +Z direction is directed upward along a vertical direction V. In other words, the X direction in which the long side of the front plate portion 13 extends is directed to a horizontal direction.

Figure 3:
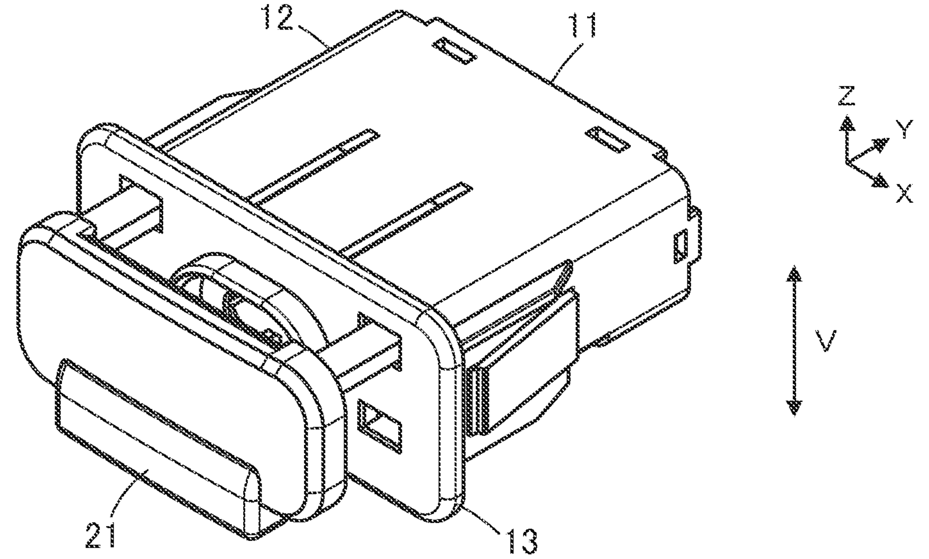
FIG. 3 is a perspective view showing the connector unit in the first position in Embodiment 1 with a cap being drawn from a connector housing.

As shown in FIG. 3, the cap 21 is movably attached to the connector housing 11 and can be drawn in the −Y direction from the connector housing 11.

Figure 4:
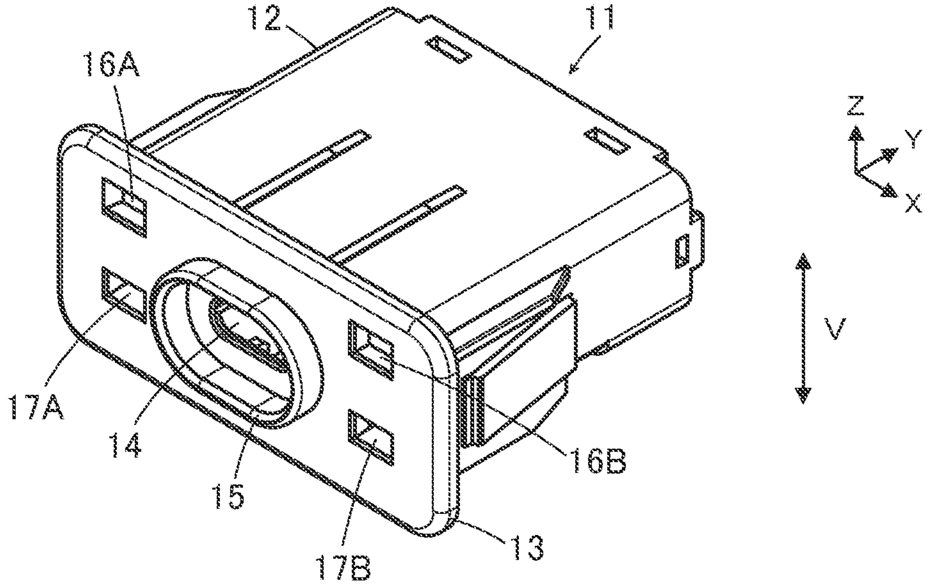
FIG. 4 is a perspective view showing the connector housing in the first position in Embodiment 1.

As shown in FIG. 4, the front plate portion 13 of the connector 11 is provided at a substantially central portion thereof with an opening portion 14 which opens in the fitting direction of fitting with a counter connector (not shown) and in which the counter connector is inserted in a fitting process with the counter connector. As a counter connector, for example, a universal serial bus (USB) connector can be used, and the counter connector is inserted into the opening portion 14 of the front plate portion 13 from the −Y direction toward the +Y direction.

At a periphery of the opening portion 14, provided is a protrusion portion 15 extending in an XZ plane so as to form an oval frame surrounding the opening portion 14 and protruding in the −Y direction.

In addition, on the −X direction side and the +X direction side of the opening portion 14 and at positions shifted in the +Z direction from the opening portion 14, the front plate portion 13 is provided with a pair of through-holes 16A and 16B penetrating the front plate portion 13.

Further, on the −X direction side and the +X direction side of the opening portion 14 and at positions shifted in the −Z direction from the opening portion 14, the front plate portion 13 is provided with a pair of through-holes 17A and 17B penetrating the front plate portion 13.

Figure 5:
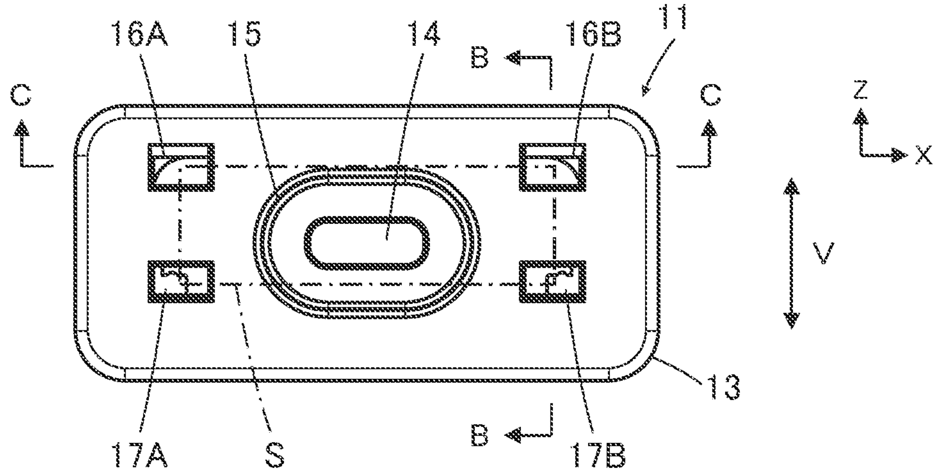
FIG. 5 is a front view showing the connector housing in the first position in Embodiment 1.

As shown in FIG. 5, the pair of through-holes 16A and 16B at the positions shifted in the +Z direction from the opening portion 14 and the pair of through-holes 17A and 17B at the positions shifted in the −Z direction from the opening portion 14 are positioned at four vertexes of a rectangular S surrounding the opening portion 14 and having a pair of long sides extending in the X direction and a pair of short sides extending in the Z direction.

When the connector unit is disposed in the first position, each of the pair of through-holes 16A and 16B on the +Z direction side functions as a cap attachment hole for attaching the cap 21 to the connector housing 11, while each of the pair of through-holes 17A and 17B on the −Z direction side functions as a drain hole for discharging water that has entered the connector housing 11 through the opening portion 14.

Specifically, the through-hole 16A, situated on the −X direction side, of the pair of through-holes 16A and 16B each serving as the cap attachment hole and the through-hole 17B, situated on the +X direction side, of the pair of through-holes 17A and 17B each serving as the drain hole are respectively positioned at two vertexes situated on one of two diagonal lines of the rectangular S, while the through-hole 16B, situated on the +X direction side, of the pair of through-holes 16A and 16B each serving as the cap attachment hole and the through-hole 17A, situated on the −X direction side, of the pair of through-holes 17A and 17B each serving as the drain hole are respectively positioned at two vertexes situated on the other of the two diagonal lines of the rectangular S.

Figure 6:
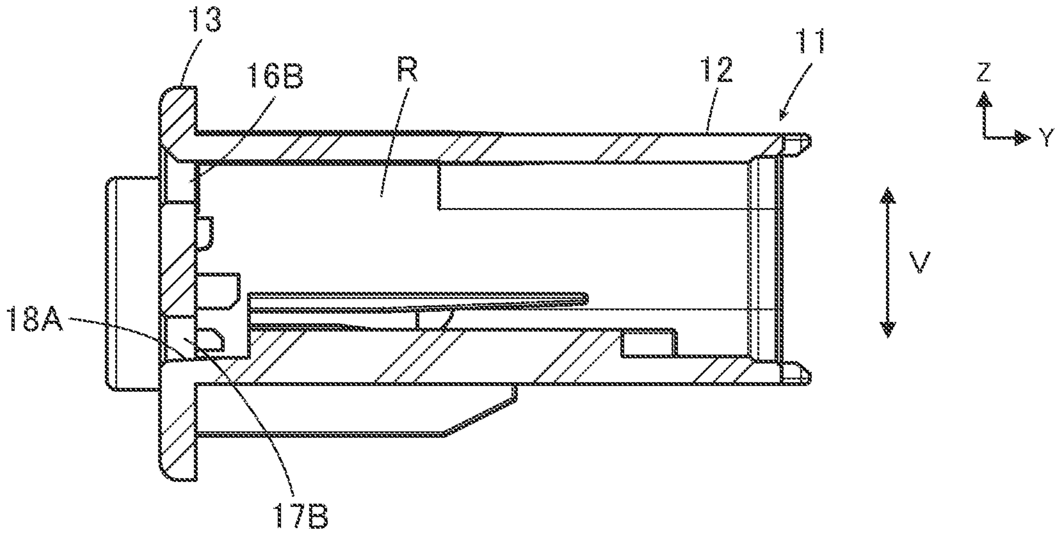
FIG. 6 is a cross-sectional view taken along line B-B in FIG. 5.

As shown in FIG. 6, the housing body portion 12 has a drain guide surface 18A that is connected to the through-hole 17B disposed on the −Z direction side to function as the drain hole and that is inclined downward and toward the outside of the connector housing 11 when the connector unit is disposed in the first position. The drain guide surface 18A is inclined so as to be positioned farther in the −Z direction as advancing toward the −Y direction. Similarly, the drain guide surface 18A inclined so as to be positioned farther in the −Z direction as advancing toward the −Y direction is connected also to the through-hole 17A situated on the −X direction side from the through-hole 17B.

Since the drain guide surface 18A as above is connected to each of the through-holes 17A and 17B, even when water has entered the connector housing 11 through the opening portion 14 of the connector unit disposed in the first position, the water can be guided by the drain guide surface 18A and easily discharged from the through-holes 17A and 17B to the outside of the connector housing 11.

Figure 7:
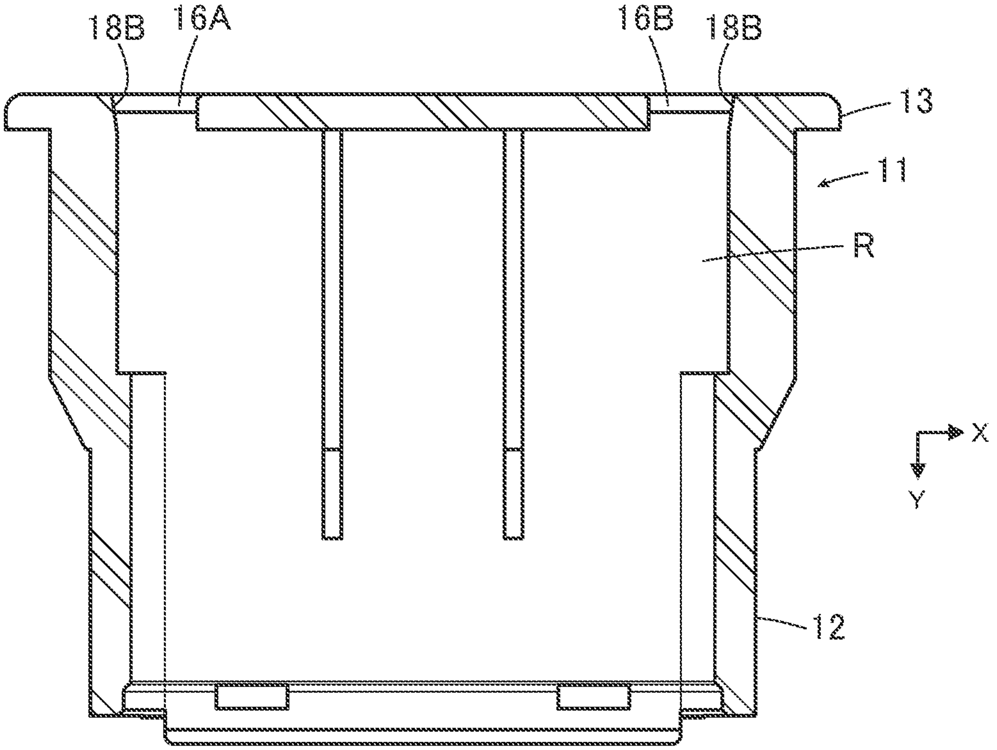
FIG. 7 is a cross-sectional view taken along line C-C in FIG. 5.

Further, as shown in FIG. 7, when viewed in the Z direction, drain guide surfaces 18B are separately connected to the through-holes 16A and 16B. One drain guide surface 18B connected to the through-hole 16A, situated on the −X direction side, of the through-holes 16A and 16B is inclined so as to be positioned farther in the −X direction as advancing toward the −Y direction, while the other drain guide surface 18B connected to the through-hole 16B, situated on the +X direction side, is inclined to be positioned farther in the +X direction as advancing toward the −Y direction.

These drain guide surfaces 18B are configured to guide water that has entered the connector housing 11 to be discharged when the connector unit is disposed not in the first position but, for example, in a second position in which the X direction is directed to the vertical direction V.

The same drain guide surfaces 18B are separately connected also to the through-holes 17A and 17B situated on the −Z direction side from the through-holes 16A and 16B. In other words, one drain guide surface 18B connected to the through-hole 17A, situated on the −X direction side, of the through-holes 17A and 17B is inclined so as to be positioned farther in the −X direction as advancing toward the −Y direction, while the other drain guide surface 18B connected to the through-hole 17B, situated on the +X direction side, is inclined to be positioned farther in the +X direction as advancing toward the −Y direction.

Figure 8:
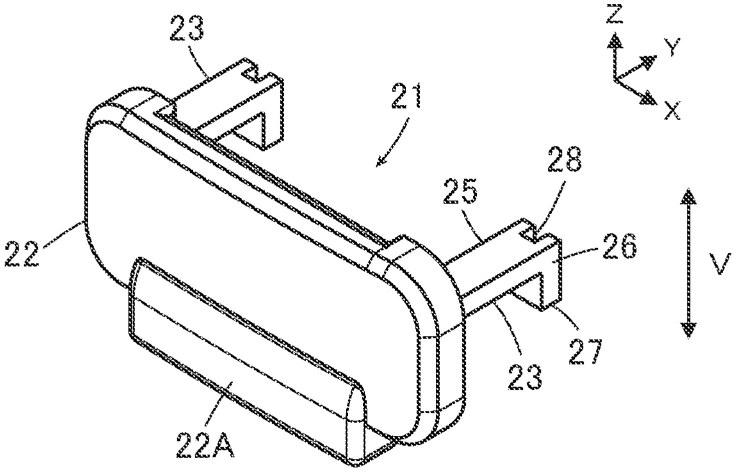
FIG. 8 is a perspective view showing the cap.

As shown in FIG. 8, the cap 21 includes a lid portion 22 of rectangular and substantially flat plate shape extending along an XZ plane and a pair of L-shaped arms 23 joined to the lid portion 22 and extending in the +Y direction. The pair of L-shaped arms 23 correspond to the pair of through-holes 16A and 16B formed in the front plate portion 13 of the connector housing 11. A −Z directional end of the lid portion 22 is provided with a handle portion 22A for moving the cap 21.

Each of the pair of L-shaped arms 23 includes a support portion 25 of rod shape projecting and extending in the +Y direction from a back surface of the lid portion 22 at a position shifted in the +Z direction in the back surface facing in the +Y direction, a bent portion 26 formed at a +Y directional end of the support portion 25, and a hook portion 27 of rod shape extending in the −Z direction from the bent portion 26.

The bent portion 26 is a connection portion between the support portion 25 and the hook portion 27 intersecting orthogonally to each other, and has a corner portion sharply pointed in the +Y direction and the +Z direction.

In addition, the bent portion 26 is provided with a cutout 28 disposed at a middle part of the bent portion 26 in the X direction and extending along a YZ plane, and due to the presence of this cutout 28, thin-wall parts are formed in the bent portion 26. While the cap 21 is made of an elastic material, the bent portion 26 has the thin-wall portions so as to be elastically deformed more easily.

Although not shown in FIG. 8, at a substantially central portion of the back surface, facing in the +Y direction, of the lid portion 22, a fitting recessed portion of oval shape is formed to correspond to the protrusion portion 15 formed on the front plate portion 13 of the connector housing 11, and it is configured such that when the protrusion portion 15 of the connector housing 11 is fitted into this fitting recessed portion, the cap 21 is fixed to the front plate portion 13, and when the cap 21 is fixed, there is a gap between the cap 21 and the front plate portion 13, and water can be discharged even when the cap 21 is fixed.

Figure 9:
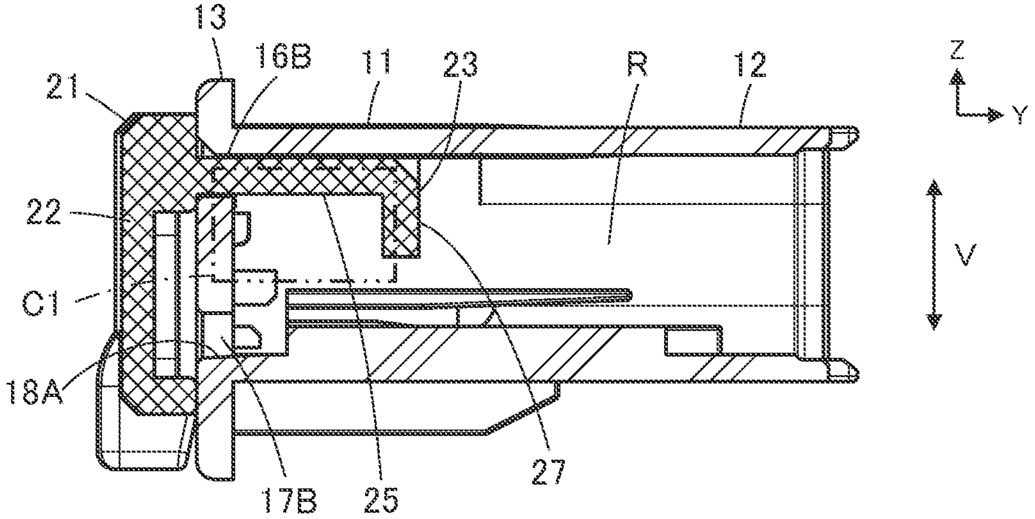
FIG. 9 is a cross-sectional view taken along line A-A in FIG. 2.

As shown in FIG. 9, one L-shaped arm 23, situated on the +X direction side, of the pair of L-shaped arms 23 of the cap 21 is passed through the through-hole 16B of the connector housing 11, and similarly, the other L-shaped arm 23, situated on the −X direction side, of the pair of L-shaped arms 23 of the cap 21 is passed through the through-hole 16A of the connector housing 11. The cap 21 is retained by the connector housing 11 with the hook portions 27 of the pair of L-shaped arms 23 being accommodated in an inner space R of the housing body portion 12 and the support portions 25 being separately passed through the through-holes 16A and 16B.

A connector portion C1 to be fitted with a counter connector (not shown) along a Y axis and other components are incorporated in the inner space R of the housing body portion 12.

When a counter connector is not fitted with the connector portion C1, as shown in FIG. 9, the cap 21 is moved in the +Y direction with the support portions 25 being separately passed through the through-holes 16A and 16B until the lid portion 22 makes contact with the front plate portion 13 of the connector housing 11.

Figure 10:
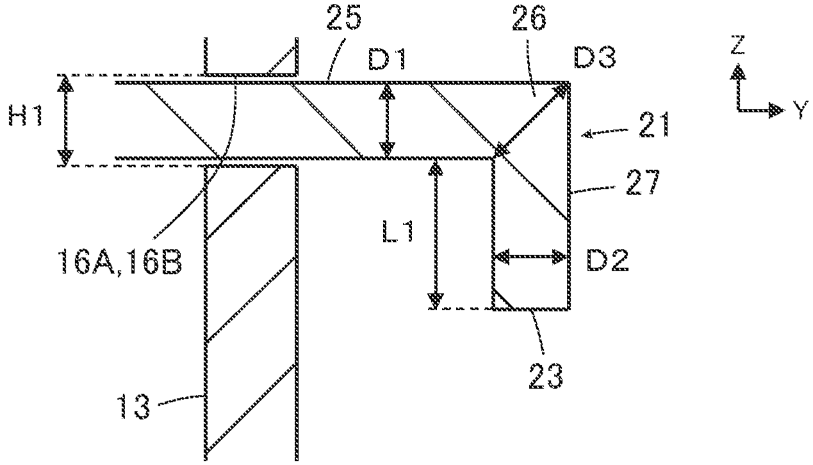
FIG. 10 is a cross-sectional view showing an L-shaped arm of the cap that has been passed through a cap attachment hole of a front plate portion.

As shown in FIG. 10, when viewed in the X direction perpendicular to a YZ plane including the support portion 25, the bent portion 26, and the hook portion 27 of the L-shaped arm 23 of the cap 21, the support portion 25 and the hook portion 27 respectively have thickness dimensions D1 and D2 smaller than a dimension H1 of the through-hole 16A, 16B serving as the cap attachment hole of the front plate portion 13.

Therefore, the support portion 25 and the hook portion 27 of the L-shaped arm 23 can be moved in the Y direction smoothly when these portions are passed through the through-hole 16A, 16B.

On the other hand, the bent portion 26 of the L-shaped arm 23 has a maximum dimension D3 larger than the dimension H1 of the through-hole 16A, 16B. The maximum dimension D3 of the bent portion 26 shown in FIG. 10 is represented by a distance from a connection portion between a −Z directional edge of the support portion 25 and a −Y directional edge of the hook portion 27 up to the corner portion, sharply pointed in the +Y direction and the +Z direction, of the bent portion 26. In addition, a maximum value of a cross-sectional area when the bent portion 26 is cut by a cross section perpendicular to a YZ plane including the support portion 25, the bent portion 26, and the hook portion 27 is a value larger than the area of the through-hole 16A, 16B.

Therefore, when the bent portion 26 is once passed through the cap attachment hole 16 and accommodated in the inner space R of the housing body portion 12, the cap 21 does not easily come out of the through-hole 16A, 16B even when a force to move the L-shaped arm 23 in the −Y direction with respect to the front plate portion 13 and pull out the L-shaped arm 23 from the through-hole 16A, 16B acts on the cap 21.

Further, the hook portion 27 of the L-shaped arm 23 has a length dimension L1 larger than the dimension H1 of the through-hole 16A, 16B. Therefore, when the L-shaped arm 23 is moved in the −Y direction with respect to the front plate portion 13, the hook portion 27 makes contact with and hooked by the back surface, facing in the +Y direction, of the front plate portion 13, whereby the L-shaped arm 23 cannot be easily pulled out from the through-hole 16A, 16B.

When the cap 21 is attached to the connector housing 11, tips of the hook portions 27 of the pair of L-shaped arms 23 of the cap 21 are separately passed through and inserted into the through-holes 16A and 16B of the front plate portion 13 in the +Y direction, and thereafter, the bent portions 26 of the pair of L-shaped arms 23 are separately inserted into the through-holes 16A and 16B while being elastically deformed and squashed by an operator's finger or the like. At this time, due to the presence of the cutouts 28 shown in FIG. 8, the bent portions 26 are formed to be easily elastically deformed, so that the bent portions 26 can be easily squashed and inserted into the through-holes 16A, 16B, respectively.

The pair of L-shaped arms 23 are moved in the +Y direction, and the protrusion portion 15 of the front plate portion 13 is fitted into the fitting recessed portion of the lid portion 22, whereby the cap 21 is fixed to the connector housing 11.

Next, when a counter connector (not shown) is fitted with the connector portion C1, the cap 21 is drawn from the connector housing 11 until the hook portions 27 of the pair of L-shaped arms 23 of the cap 21 make contact with and are hooked by the front plate portion 13 of the connector housing 11, and in this state, the lid portion 22 of the cap 21 is turned up in the +Z direction, and the counter connector (not shown) is inserted from the −Y direction to the +Y direction through the opening portion 14 of the front plate portion 13 exposed toward the −Y direction to thereby be fitted with the connector portion C1.

Therefore, while it is a simple structure, the cap 21 openably and closably covers the opening portion 14 of the connector unit disposed in the first position, and the lid portion 22 of the cap 21 is turned up, so that a counter connector can be fitted, and the cap 21 can be prevented from coming off the connector housing 11.

Note that water that has entered the connector housing 11 through the opening portion 14 of the connector unit disposed in the first position is guided by the drain guide surfaces 18A connected to the through-holes 17A and 17B each functioning as the drain hole and discharged from the through-holes 17A and 17B to the outside of the connector housing 11.

Figure 11:
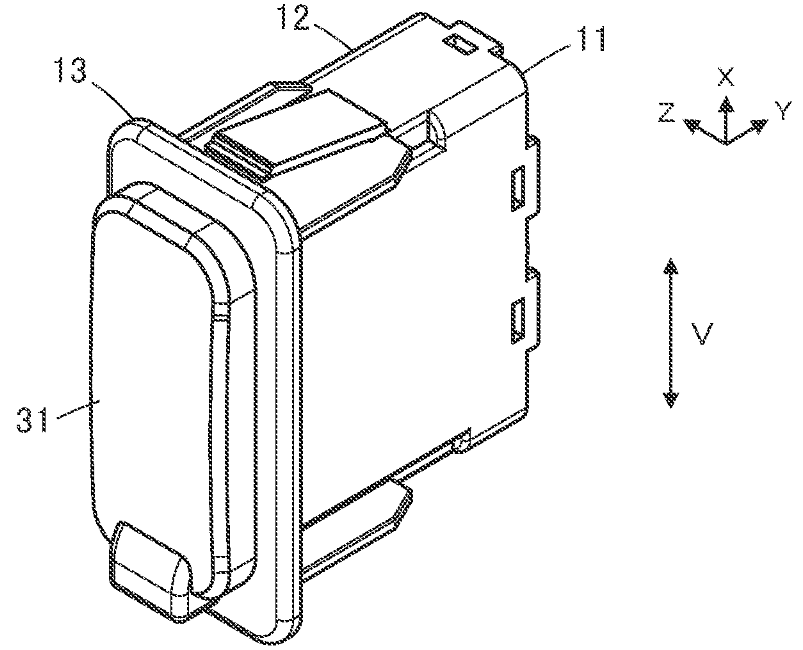
FIG. 11 is a perspective view showing the connector unit in a second position in Embodiment 1.

Here, FIG. 11 shows the connector unit disposed in a second position in which the X direction, in which the long side of the front plate portion 13 of the connector housing 11 extends, is directed to the vertical direction V. Specifically, the connector unit is disposed such that the +X direction is directed upward along the vertical direction V.

The connector unit includes the connector housing 11 and a cap 31 attached to the front part of the connector housing 11.

The connector housing 11 is rotated from the position of the connector housing 11 shown in FIG. 4 by 90 degrees around the Y axis, and the cap 31 is different from the cap 21 used in the case of the first position and is a dedicated cap for the second position.

That is, in both cases where the connector unit is disposed in the first position and where the connector unit is disposed in the second position, the connector housing 11 is commonly used, and either of the cap 21 and the cap 31 is used depending on the first position and the second position.

Figure 12:
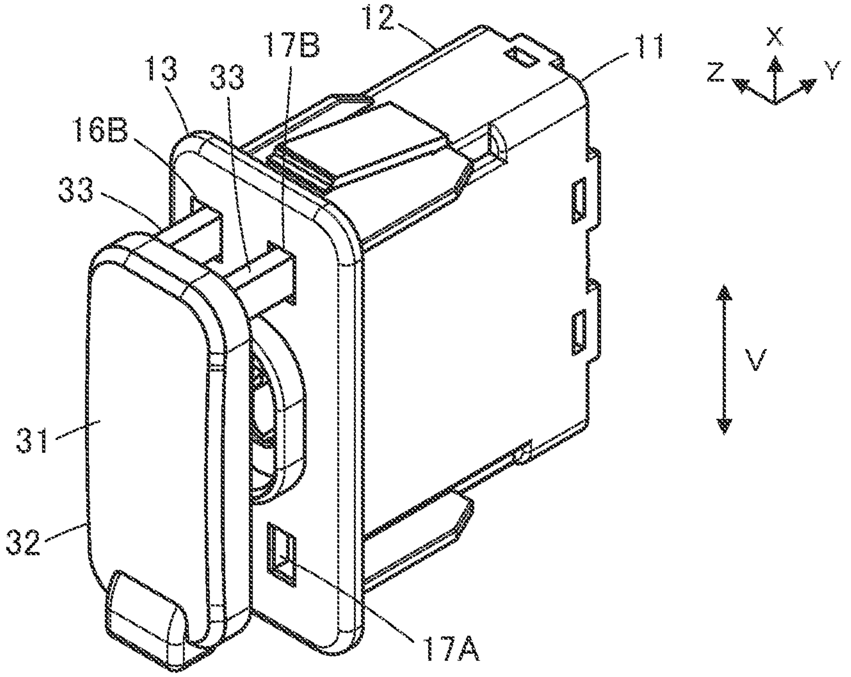
FIG. 12 is a perspective view showing the connector unit in the second position in Embodiment 1 with a cap being drawn from the connector housing.

As shown in FIG. 12, the cap 31 is movably attached to the connector housing 11 and can be drawn in the −Y direction from the connector housing 11.

As with the cap 21 shown in FIG. 8, the cap 31 is made of an elastic material such as EPDM and includes a lid portion 32 of rectangular and substantially flat plate shape elongated in the X direction along an XZ plane and a pair of L-shaped arms 33 joined to the lid portion 32 and extending in the +Y direction.

Since the connector unit is disposed such that the +X direction is directed upward along the vertical direction V, of the four through-holes 16A, 16B, 17A, 17B formed in the front plate portion 13 of the connector housing 11, the through-holes 16B and 17B disposed on the +X direction side each function as the cap attachment hole, and the through-holes 16A and 17A disposed on the −X direction side each function as the drain hole.

The pair of L-shaped arms 33 of the cap 31 are separately inserted in the through-holes 16B and 17B each serving as the cap attachment hole.

Figure 13:
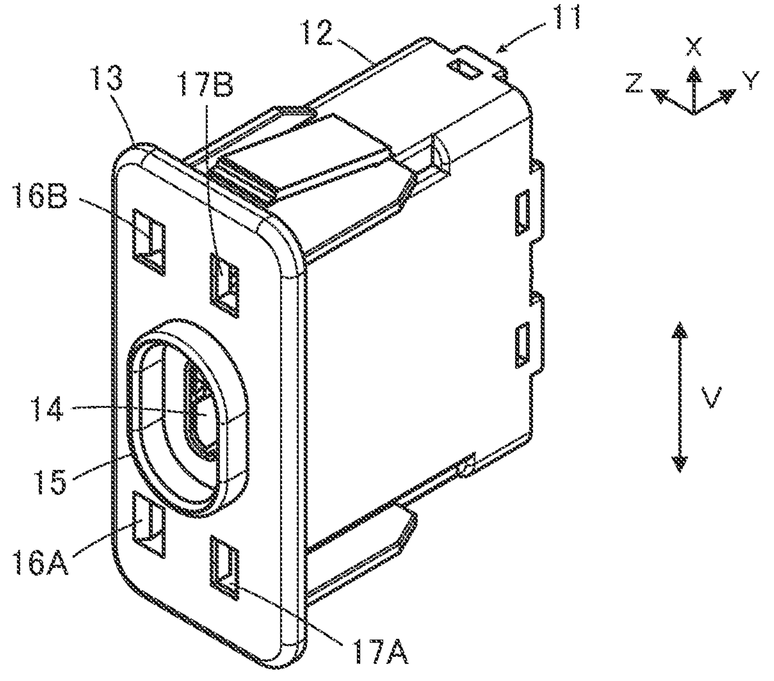
FIG. 13 is a perspective view showing the connector housing in the second position in Embodiment 1.

FIG. 13 shows the connector housing 11 in the second position. The through-holes 16B and 17B each serving as the cap attachment hole is situated on the upper side in the vertical direction V from the opening portion 14, while the through-holes 16A and 17A each serving as the drain hole is situated on the lower side in the vertical direction V from the opening portion 14.

Figure 14:
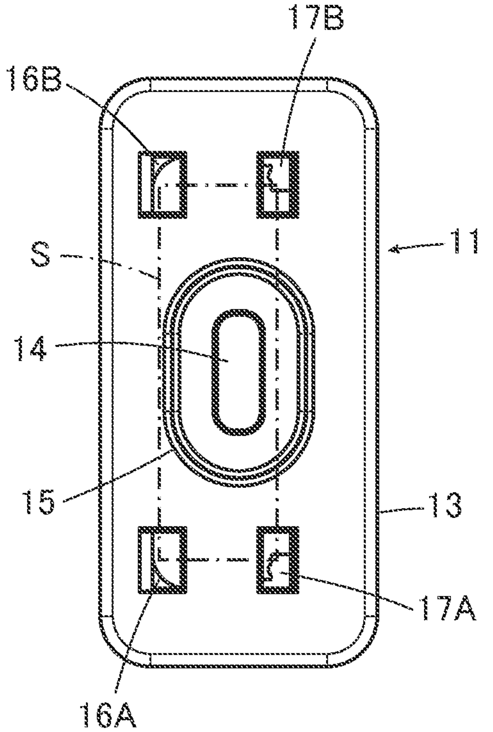
FIG. 14 is a front view showing the connector housing in the second position in Embodiment 1.

As shown in FIG. 14, also in the second position, the through-holes 16B and 17B situated on the upper side in the vertical direction V and the through-holes 16A and 17A situated on the lower side in the vertical direction V are positioned at the four vertexes of the rectangular S surrounding the opening portion 14.

Figure 15:
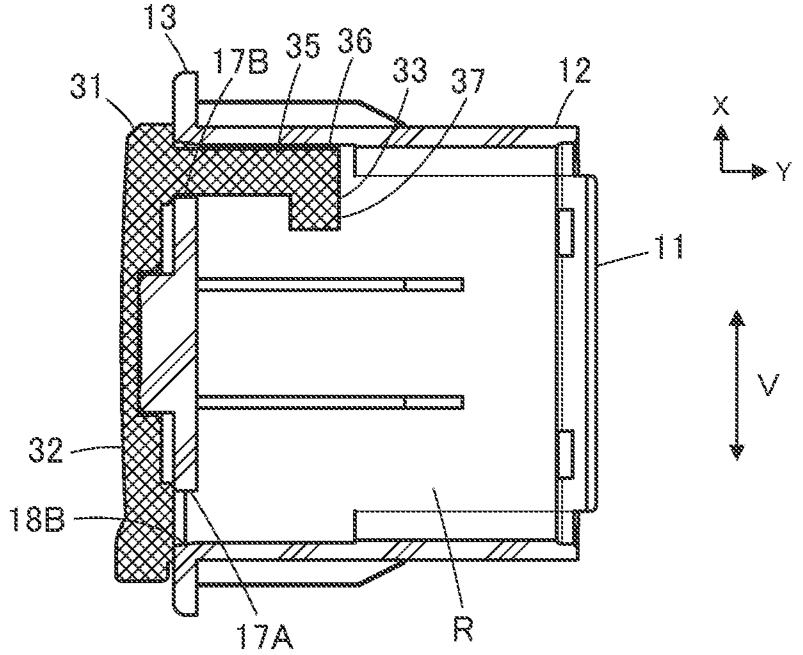
FIG. 15 is a cross-sectional view showing the connector unit in the second position in Embodiment 1.

As shown in FIG. 15, the L-shaped arm 33, situated on the −Z direction side, of the pair of L-shaped arms 33 of the cap 31 is passed through the through-hole 17B of the connector housing 11, and similarly, the L-shaped arm 33, situated on the +Z direction side, of the pair of L-shaped arms 33 of the cap 31 is passed through the through-hole 16B of the connector housing 11. As with the L-shaped arm 23 of the cap 21, the L-shaped arm 33 includes a support portion 35 of rod shape projecting and extending in the +Y direction from a back surface of the lid portion 32 at a position shifted in the +X direction in the back surface facing in the +Y direction, a bent portion 36 formed at a +Y directional end of the support portion 35, and a hook portion 37 of rod shape extending in the −X direction from the bent portion 36.

The cap 31 is retained by the connector housing 11 with the hook portions 37 of the pair of L-shaped arms 33 being accommodated in the inner space R of the housing body portion 12 and the support portions 35 being separately passed through the through-holes 16B and 17B.

As with the cap 21, when viewed in the Z direction perpendicular to an XY plane including the support portion 35, the bent portion 36, and the hook portion 37 of the L-shaped arm 33 of the cap 31, the support portion 35 and the hook portion 37 each have a thickness dimension smaller than the dimension of the through-hole 16B, 17B serving as the cap attachment hole of the front plate portion 13, and the bent portion 36 has a maximum dimension larger than the dimension of the through-hole 16A, 16B.

Therefore, while it is a simple structure, the cap 31 openably and closably covers the opening portion 14 of the connector unit disposed in the second position, and the lid portion 32 of the cap 31 is turned up, so that a counter connector can be fitted, and the cap 31 can be prevented from coming off the connector housing 11.

Note that water that has entered the connector housing 11 through the opening portion 14 of the connector unit disposed in the second position is guided by the drain guide surfaces 18B separately connected to the through-holes 16A and 17A each functioning as the drain hole and discharged from the through-holes 16A and 17A to the outside of the connector housing 11.

Embodiment 2

In Embodiment 1 above, the cap 21 used in the connector unit disposed in the first position is retained by the connector housing 11 by the pair of L-shaped arms 23, and the cap 31 used in the connector unit disposed in the second position is also retained by the connector housing 11 by the pair of L-shaped arms 33, but the invention is not limited thereto. For example, a cap can be retained by only one L-shaped arm.

Figure 16:
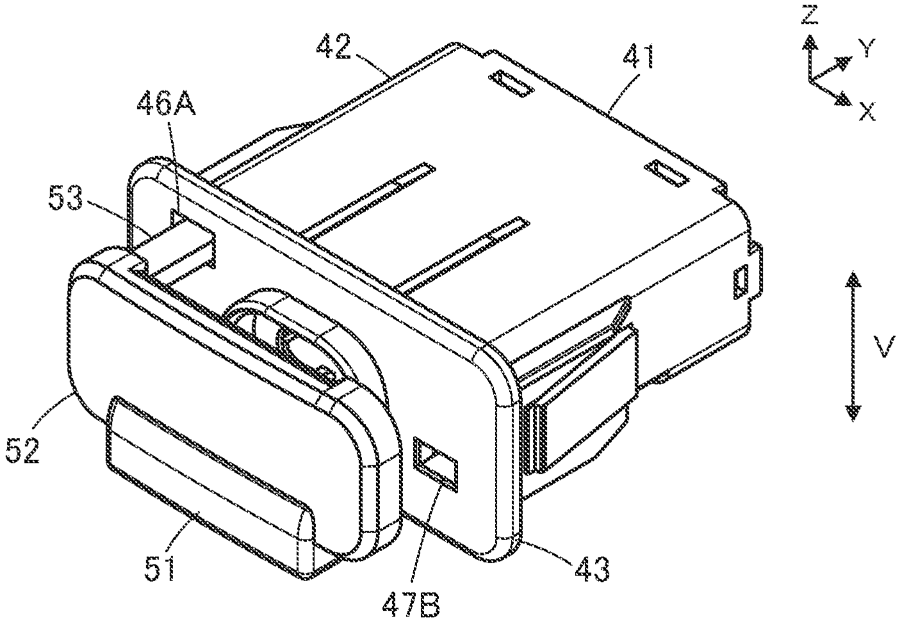
FIG. 16 is a perspective view showing a connector unit in a first position in Embodiment 2 with a cap being drawn from a connector housing.

FIG. 16 shows a connector unit according to Embodiment 2. The connector unit includes a connector housing 41 made of an insulating material such as an insulating resin and a cap 51 attached to a front part of the connector housing 41 and made of an elastic material such as EPDM. FIG. 16 shows the state where the cap 51 is drawn from the connector housing 41.

In addition, the connector unit shown in FIG. 16 is disposed in a first position in which the +Z direction is directed upward along the vertical direction V.

Figure 17:
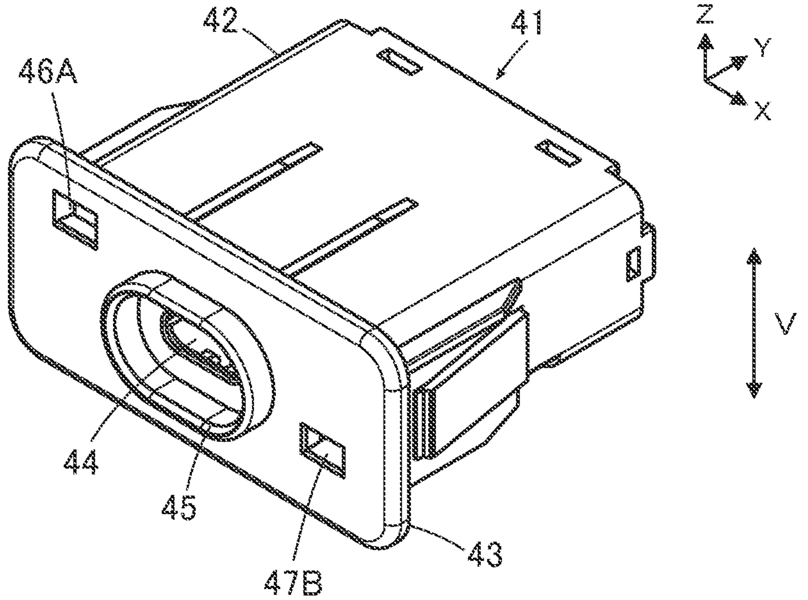
FIG. 17 is a perspective view showing the connector housing in the first position in Embodiment 2.

The connector housing 41 includes a housing body portion 42 having a substantially cuboid shape and a front plate portion 43 of rectangular shape formed at a front edge of the housing body portion 42, and as shown in FIG. 17, the front plate portion 43 is provided at a substantially central portion thereof with an opening portion 44 in which a counter connector (not shown) is inserted in a fitting process with the counter connector, while at a periphery of the opening portion 44, provided is a protrusion portion 45 extending in an XZ plane so as to form an oval frame surrounding the opening portion 44 and protruding in the −Y direction.

In addition, on the −X direction side of the opening portion 44 and at a position shifted in the +Z direction from the opening portion 44, the front plate portion 43 is provided with a through-hole 46A penetrating the front plate portion 43, and on the +X direction side of the opening portion 44 and at a position shifted in the −Z direction from the opening portion 44, the front plate portion 43 is provided with a through-hole 47B penetrating the front plate portion 43.

Figure 18:
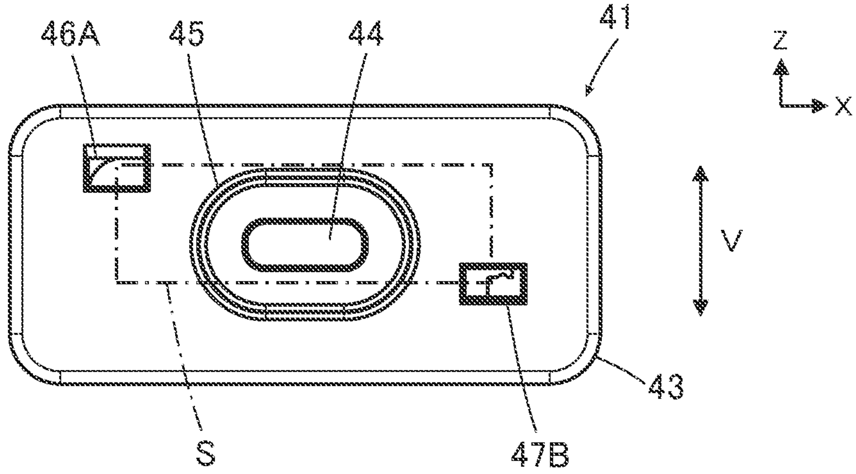
FIG. 18 is a front view showing the connector housing in the first position in Embodiment 2.

As shown in FIG. 18, the through-holes 46A and 47B are positioned at two vertexes situated on one diagonal line of a rectangular S surrounding the opening portion 44 and having a pair of long sides extending in the X direction and a pair of short sides extending in the Z direction.

When the connector unit is disposed in the first position, the through-hole 46A situated on the +Z direction side from the opening portion 44 functions as a cap attachment hole for attaching the cap 51 to the connector housing 41, while the through-hole 47B situated on the −Z direction side from the opening portion 44 functions as a drain hole for discharging water that has entered the connector housing 41 through the opening portion 44.

That is, the connector housing 41 has the front plate portion 43 provided with the only two through-holes 46A and 47B in place of the front plate portion 13 provided with the four through-holes 16A, 16B, 17A and 17B as shown in FIG. 5 in the connector housing 11 used in Embodiment 1, and the remaining configuration of the front plate portion 43 and the configuration of the housing body portion 42 are the same as those in the connector housing 11.

As shown in FIG. 16, the cap 51 includes a lid portion 52 of rectangular and substantially flat plate shape elongated in the X direction along an XZ plane and one L-shaped arm 53 projecting and extending in the +Y direction from a back surface of the lid portion 52*a* at a position shifted in the −X direction and the +Z direction in the back surface facing in the +Y direction.

The L-shaped arm 53 has the same configuration as that of the L-shaped arm 23 of the cap 21 used in Embodiment 1 and shown in FIG. 8 and includes a support portion of rod shape projecting and extending in the +Y direction from the back surface of the lid portion 52, a bent portion formed at a +Y directional end of the support portion, and a hook portion of rod shape extending in the −Z direction from the bent portion.

The L-shaped arm 53 is inserted in the through-hole 46A serving as the cap attachment hole, and the cap 51 is retained by the connector housing 41 with the hook portion of the L-shaped arm 53 being accommodated inside the housing body portion 42 and the support portion being passed through the through-hole 46A.

Even when the cap 51 has the only one L-shaped arm 53, the cap 51 openably and closably covers the opening portion 44 of the connector unit disposed in the first position, and the lid portion 52 of the cap 51 is turned up, so that a counter connector can be fitted, and the cap 51 can be prevented from coming off the connector housing 41.

Note that water that has entered the connector housing 41 through the opening portion 44 of the connector unit disposed in the first position is discharged from the through-hole 47B functioning as the drain hole to the outside of the connector housing 41.

Figure 19:
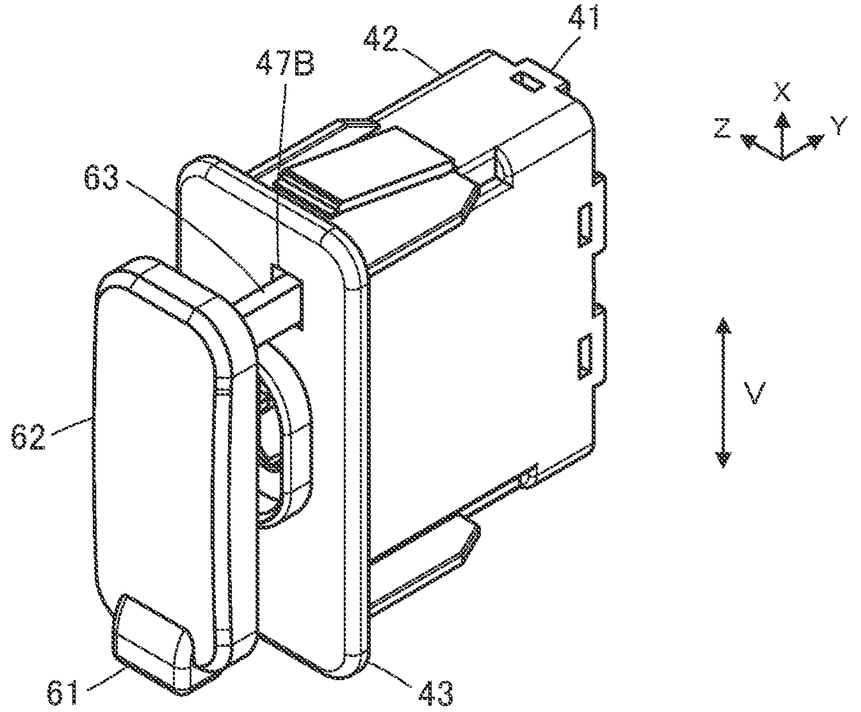
FIG. 19 is a perspective view showing the connector unit in a second position in Embodiment 2 with a cap being drawn from the connector housing.

Here, FIG. 19 shows the connector unit disposed in a second position in which the X direction, in which the long side of the front plate portion 43 of the connector housing 41 extends, is directed to the vertical direction V. Specifically, the connector unit is disposed such that the +X direction is directed upward along the vertical direction V.

The connector unit includes the connector housing 41 and a cap 61 attached to the front part of the connector housing 41.

The connector housing 41 is rotated from the position of the connector housing 41 shown in FIG. 17 by 90 degrees around the Y axis, and the cap 61 is different from the cap 51 used in the case of the first position and is a dedicated cap for the second position.

That is, in both cases where the connector unit is disposed in the first position and where the connector unit is disposed in the second position, the connector housing 41 is commonly used, and either of the cap 51 and the cap 61 is used depending on the first position and the second position.

Figure 20:
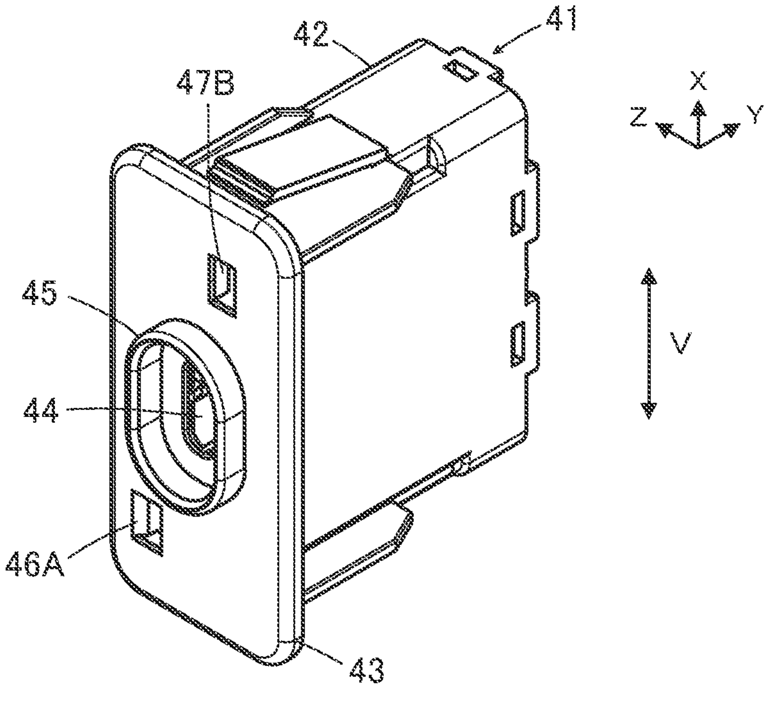
FIG. 20 is a perspective view showing the connector housing in the second position in Embodiment 2.
Figure 21:
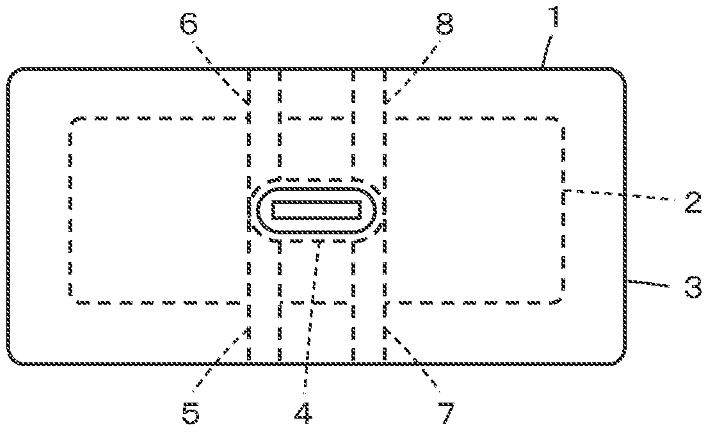
FIG. 21 PRIOR ART
FIG. 21 is a front view showing a conventional connector unit.

When the connector unit is disposed in the second position, as shown in FIG. 20, the through-hole 47B is situated on the +Z direction side from the opening portion 44 and functions as a cap attachment hole for attaching the cap 61 to the connector housing 41, while the through-hole 46A is situated on the −Z direction side from the opening portion 44 and functions as a drain hole for discharging water that has entered the connector housing 41 through the opening portion 44.

As shown in FIG. 19, the cap 61 is movably attached to the connector housing 41 and can be drawn in the −Y direction from the connector housing 41.

The cap 61 is made of an elastic material such as EPDM and includes a lid portion 62 of rectangular and substantially flat plate shape elongated in the X direction along an XZ plane and one L-shaped arm 63 projecting and extending in the +Y direction from a back surface of the lid portion 62 at a position shifted in the +X direction and the −Z direction in the back surface facing in the +Y direction.

The L-shaped arm 63 has the same configuration as that of the L-shaped arm 33 of the cap 31 used in Embodiment 1 and shown in FIG. 15 and includes a support portion of rod shape projecting and extending in the +Y direction from the back surface of the lid portion 62, a bent portion formed at a +Y directional end of the support portion, and a hook portion of rod shape extending in the −X direction from the bent portion.

This L-shaped arm 63 is inserted in the through-hole 47B serving as the cap attachment hole, and the cap 61 is retained by the connector housing 41 with the hook portion of the L-shaped arm 63 being accommodated inside the housing body portion 42 and the support portion being passed through the through-hole 47B.

Even when the cap 61 has the only one L-shaped arm 63, the cap 61 openably and closably covers the opening portion 44 of the connector unit disposed in the second position, and the lid portion 62 of the cap 61 is turned up, so that a counter connector can be fitted, and the cap 61 can be prevented from coming off the connector housing 41.

Note that water that has entered the connector housing 41 through the opening portion 44 of the connector unit disposed in the second position is discharged from the through-holes 46A functioning as the drain hole to the outside of the connector housing 41.

Therefore, in Embodiment 2, the front plate portion 43 of the connector housing 41 is provided with not four through-holes but only the two through-holes 46A and 47B, and these through-holes 46A and 47B are positioned at the two vertexes situated on one diagonal line of the rectangular S surrounding the opening portion 44. Therefore, in both cases where the connector housing 41 is in the first position as shown in FIG. 17 and where the connector housing 41 is in the second position as shown in FIG. 20, one of the two through-holes 46A and 47B is situated on the upper side from the opening portion 44 and can serve as the cap attachment hole, and the other of the two through-holes 46A and 47B is situated on the lower side from the opening portion 44 and can serve as the drain hole.

Therefore, even when the connector unit is disposed in either of the first portion and the second position, the cap 51 having only the one L-shaped arm 53 or the cap 61 having only the one L-shaped arm 63 openably and closably covers the opening portion 44, and the lid portion 52, 62 of the cap 51, 61 is turned up, so that a counter connector can be fitted, and water that has entered the connector housing 41 through the opening portion 44 can be discharged to the outside of the connector housing 41.

In Embodiments 1 and 2 above, as shown in FIGS. 11 and 19, the position in which the +X direction of the connector unit is directed upward along the vertical direction V is referred to as the "second position," but the position in which the −X direction of the connector unit is directed upward along the vertical direction V can also be referred to as the "second position." In this case, in Embodiment 1, the through-holes 16A and 17A of the connector housing 11 are situated on the upper side in the vertical direction V from the opening portion 14 and each serve as the cap attachment hole, while the through-holes 16B and 17B of the connector housing 11 are situated on the lower side of the vertical direction V from the opening portion 14 and each serve as the drain hole. In Embodiment 2, the through-hole 46A of the connector housing 41 is situated on the upper side in the vertical direction V from the opening portion 44 and serves as the cap attachment hole, while the through-hole 47B is situated on the lower side in the vertical direction V from the opening portion 44 and serves as the drain hole.

In Embodiments 1 and 2, the position in which the Z direction of the connector unit is directed to the vertical direction V is referred to as the "first position," and the position in which the X direction of the connector unit is directed to the vertical direction V is referred to as the "second position," but the Z direction or the X direction of the connector unit is not necessarily directed to the vertical direction V. For example, a position in which the Z direction of the connector unit is inclined by 45 degrees or smaller with respect to the vertical direction V may also be the "first position," while a position in which the X direction of the connector unit is inclined by 45 degrees or smaller with respect to the vertical direction V may also be the "second position," and by adopting this invention, with a simple structure, the cap 21, 31, 51, 61 openably and closably covers the opening portion 14, 44 of the connector unit, and water that has entered the connector housing 11, 41 through the opening portion 14, 44 can be discharged to the outside of the connector housing 11, 41 through the through-hole serving as the drain hole.

What is claimed is:

1. A connector unit in which an opening portion for inserting a counter connector is openably and closably covered by a cap, the connector unit comprising:

a connector portion to be fitted with the counter connector;

a connector housing retaining the connector portion and having the opening portion; and the cap that is attached to the connector housing, wherein the connector housing includes a front plate portion that is provided with the opening portion, and two or more through-holes penetrating the front plate portion and communicating with an inside of the connector housing, two through-holes of the two or more through-holes are positioned at two vertexes situated on one diagonal line of a rectangular surrounding the opening portion in the front plate portion, and when the connector unit is disposed, one of the two through-holes is situated on an upper side from the opening portion and serves as a cap attachment hole for attaching the cap to the connector housing, and another of the two through-holes is situated on a lower side from the opening portion and serves as a drain hole for the connector housing.

2. The connector unit according to claim 1, wherein the connector housing includes four through-holes as the two or more through-holes each penetrating the front plate portion and communicating with the inside of the connector housing, the four through-holes are separately positioned at four vertexes of the rectangular surrounding the opening portion, and when the connector unit is disposed, two of the four through-holes each serve as the cap attachment hole, and remaining two of the four through-holes each serve as the drain hole.

3. The connector unit according to claim 1, wherein the connector housing has a drain guide surface connected to the through-hole situated on the lower side from the opening portion and inclined downward toward an outside of the connector housing when the connector unit is disposed.

4. The connector unit according to claim 1, wherein the cap includes a lid portion having a back surface facing the front plate portion, and an L-shaped arm joined to the lid portion and made of an elastic material, the L-shaped arm includes a support portion of rod shape projecting and extending in a direction intersecting the back surface of the lid portion, a bent portion formed at a tip of the support portion, and a hook portion of rod shape extending from the bent portion in a direction intersecting the support portion, the cap is retained by the connector housing with the hook portion being accommodated inside the connector housing and the support portion being passed through the cap attachment hole, and when viewed in a direction perpendicular to a plane including the support portion, the bent portion, and the hook portion, the support portion and the hook portion each have a thickness dimension smaller than a dimension of the cap attachment hole, a maximum dimension of the bent portion is larger than the dimension of the cap attachment hole, and the hook portion has a length dimension larger than the dimension of the cap attachment hole.

* * * * *